United States Patent [19]
Chien

[11] Patent Number: 5,262,756
[45] Date of Patent: Nov. 16, 1993

[54] SOLAR POWERED WARNING LIGHT

[76] Inventor: Tseng L. Chien, 675 N. Rodeo Way, Walnut, Calif. 91789

[21] Appl. No.: 670,029

[22] Filed: Mar. 15, 1991

[51] Int. Cl.[5] ............................................. G08B 5/00
[52] U.S. Cl. ........................................ 340/332; 320/21; 323/906; 340/331; 362/183
[58] Field of Search ............... 340/455, 908.1, 331, 340/332, 333; 362/183; 136/293; 320/2, 13, 48, 21, 61; 323/906; 315/134, 149, 155, 159, 307; 250/208.4, 214 AL

[56] References Cited

U.S. PATENT DOCUMENTS

| | | |
|---|---|---|
| 3,180,979 | 4/1965 | Thurston . |
| 3,221,300 | 11/1965 | Elledge, Jr. . |
| 3,264,461 | 8/1966 | Osburn . |
| 3,989,980 | 11/1976 | Berman ............................ 340/468 |
| 4,387,416 | 6/1983 | Decker . |
| 4,389,632 | 6/1983 | Seidler ............................... 340/332 |
| 4,482,941 | 11/1984 | Lindner . |
| 4,626,852 | 12/1986 | Dodge ................................ 340/331 |
| 4,626,983 | 12/1986 | Harada et al. ..................... 323/906 |
| 4,751,622 | 6/1988 | Williams .......................... 340/908.1 |
| 4,759,735 | 7/1988 | Pagnol et al. ...................... 340/331 |
| 4,884,017 | 11/1989 | Williams ................................ 320/2 |
| 5,063,341 | 11/1991 | Gali .................................... 323/906 |
| 5,084,664 | 1/1992 | Gali .................................... 323/906 |

Primary Examiner—Brent Swarthout
Attorney, Agent, or Firm—Sheldon & Mak

[57] ABSTRACT

A solar powered warning light apparatus including a solar module that charges a single rechargeable Ni-Cad battery is operable for intermittently flashing a xenon flash tube. A recharging network of the apparatus allows the solar cell module to recharge the battery when sunlight is impinging upon the solar module for providing virtually maintenance-free and long term operation of the warning light by the battery during the dark or twilight hours when warning lights are needed to warn vehicle drivers of road hazards or environment hazards.

11 Claims, 1 Drawing Sheet

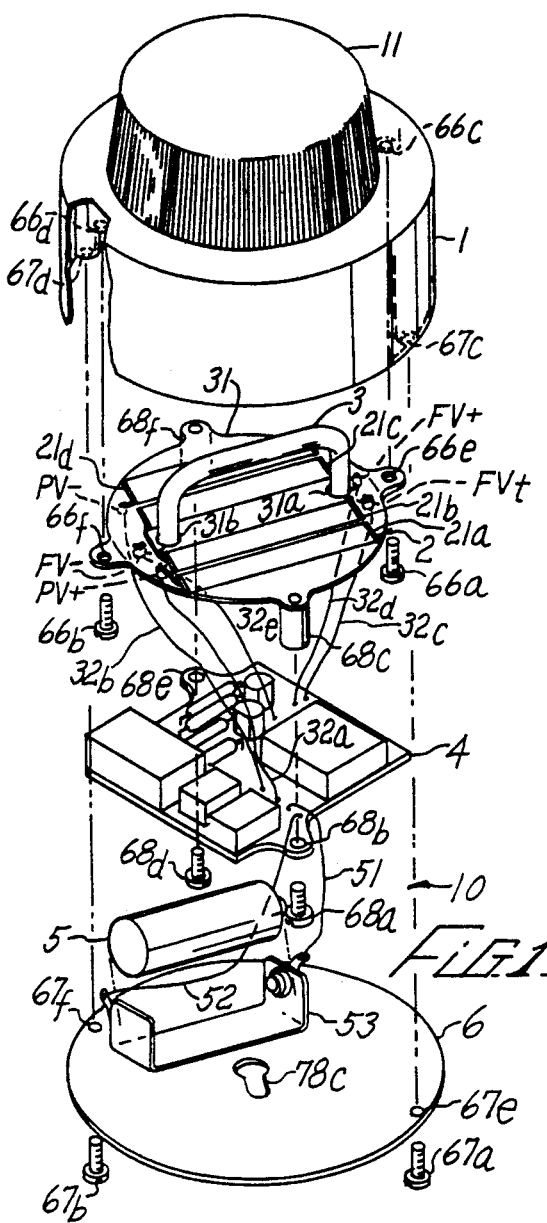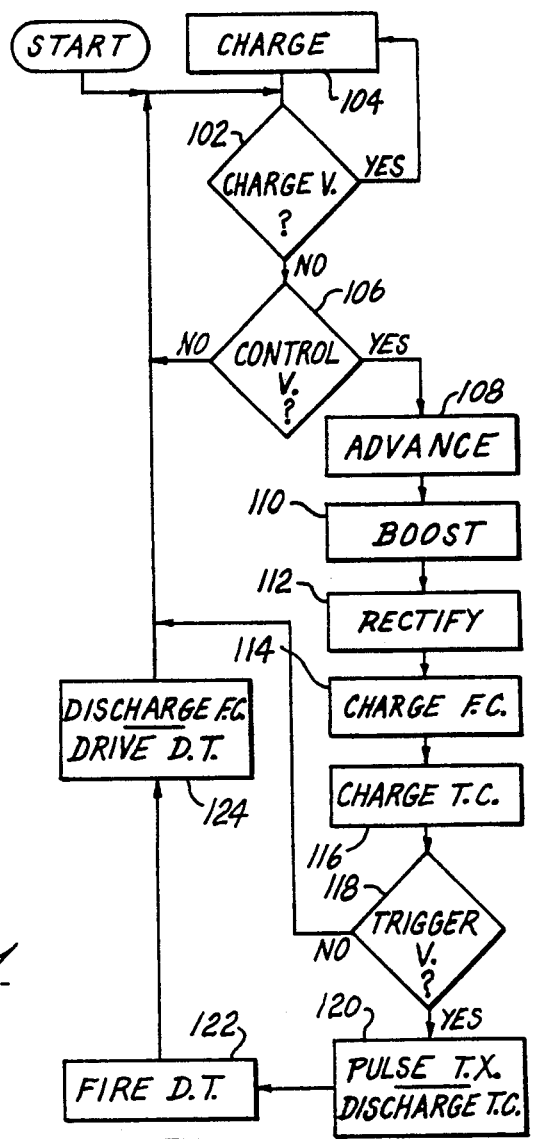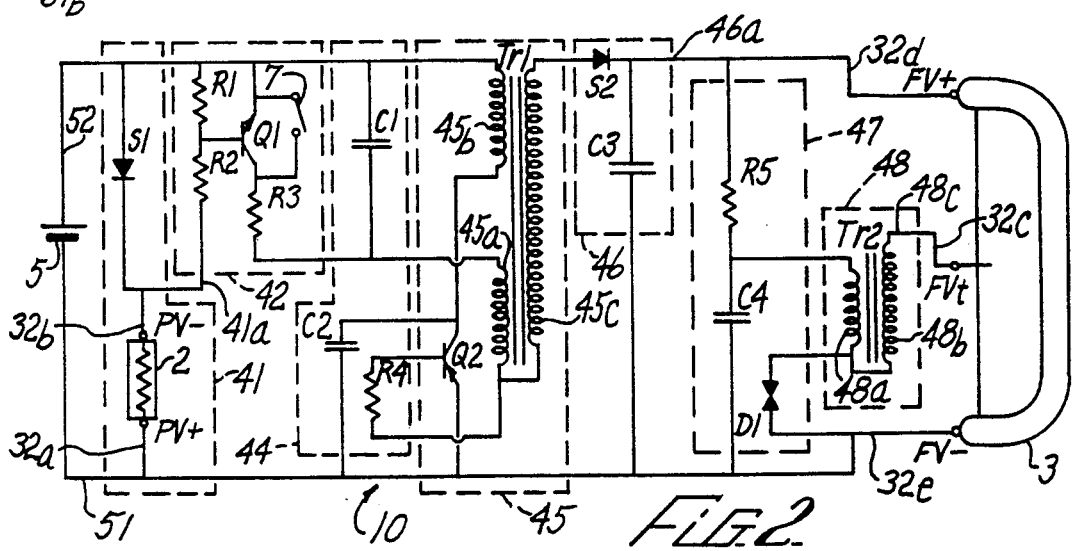

SOLAR POWERED WARNING LIGHT

BACKGROUND

The present invention relates to warning lights of the type used on barricades or drums in hazardous locations such as construction areas for warning the public of road or environmental hazards. More particularly, the invention is related to such lights that are solar powered, and lights having a flashing mode of operation.

The illumination of hazardous areas where injuries might happen at night or during twilight hours has been accomplished in the past with torches, oil-filled lanterns, battery lights, etc. Such devices are troublesome to maintain and have costly replacement parts. Another problem encountered with any warning light is theft of the light. Occasionally vandals will remove the light from its supporting barrier by merely lifting the light off the barrier and carrying it away.

One type of prior art warning light, as disclosed in U.S. Pat. No. 4,884,017 to Williams discloses a solar powered construction light and includes a simple circuit that obtains power from the sun and stores the power in a battery. When the light is turned on, the battery supplies current to the bulb. These and other warning lights of the prior art suffer from numerous disadvantages; for example:

1. they are expensive to provide in that they require high-voltage solar modules and multi-celled rechargeable batteries for proper operation;
2. they consume excessive battery power in that they operate in daylight as well as at night; and
3. they require manual operation for discontinuing daylight operation.

Thus there is a need for a warning light that overcomes these problems.

SUMMARY

The present invention meets this need by providing a solar-powered warning light apparatus that requires only a single rechargeable battery cell for operation at night. In one aspect of the invention, the apparatus includes a housing; a solar cell module in the housing, the cell module having not more than five cell elements connected in series; a single cell rechargeable battery; control circuit means operable in a first mode charging the battery in response to a threshold rate of solar energy being received by the cell module, and in a second mode for producing a control signal when less than the threshold rate of solar energy is being received by the cell module; a voltage multiplier circuit powered by the battery and responsive to the control signal; a gas-discharge tube lamp; and trigger means for firing the lamp in response to the voltage multiplier circuit.

The control circuit means can include a first diode connected in series with the battery, the first diode being forward-biased in the first mode and reverse biased in the second mode. The control signal can be a reverse bias voltage across the first diode.

The voltage multiplier circuit can include a first capacitor having a reference connection and a control connection, the control connection being resistively connected to control switch means responsive to the control signal; a driver transformer having first and second primary windings and a secondary winding, the first primary winding being connected between the control connection and a common connection to the secondary winding, the second primary winding being connected across the battery in series with drive switch means, the drive switch means being responsively coupled to the common connection between the first primary and secondary windings of the driver transformer; and filter rectifier means connected between the battery and the secondary winding of the driver transformer. Preferably the secondary winding of the driver transformer produces a multiplier voltage of at least approximately 250 volts for driving a conventional Xenon flash tube.

The trigger means can include a trigger transformer having primary and secondary windings, the secondary winding being connected to a trigger electrode of the tube lamp, the primary winding being connected in series with a trigger diode, the combination of the primary winding of the trigger transformer and the trigger diode being powered by a trigger filter circuit from the voltage multiplier circuit, a periodic pulse interval of the lamp being directly related to a filter time constant of the trigger filter.

Preferably the secondary winding of the trigger transformer produces trigger voltage of at least approximately 1000 volts, the cell module having not more than four of the cells connected in series.

The housing can include a transparent lens member for covering the solar cell module and the tube lamp. The lens member can have a horizontally disposed central portion and a side portion, the side portion sloping downwardly and outwardly from the control portion and having ribs formed therein for directing light horizontally outwardly from the tube lamp. The lens member can be generally cylindrical relative to a vertical axis of the housing.

In another aspect of the present invention, the apparatus includes the housing; the solar cell module; the battery; the means for charging the battery from the solar cell module; the voltage multiplier circuit powered by the battery and including the first capacitor, the driver transformer, and the driver transistor; the gas-discharge tube lamp; and the trigger means.

In a further aspect of the present invention, the apparatus includes the housing, a solar cell module, a rechargeable battery, the control circuit means, the voltage multiplier circuit, the gas-discharge tube lamp, and the trigger means, the control circuit means automatically cycling the apparatus between the first and second modes in response to daytime and nighttime ambient light levels.

DRAWINGS

These and other features, aspects, and advantages of the present invention will become better understood with reference to the following description, appended claims, and accompanying drawings, where:

FIG. 1 is a partly exploded oblique elevational perspective view of a warning light apparatus according to the present invention;

FIG. 2 is a is a schematic circuit diagram of the apparatus of FIG. 1; and

FIG. 3 is a functional flow diagram of the electrical circuit of FIG. 2.

DESCRIPTION

The present invention is directed to a flashing warning light for use at construction sites and other hazardous locations. With reference to FIG. 1 of the drawings, a warning light apparatus 10 in an exemplary configuration according to the present invention includes a housing 1, a lens 11, a solar element 2, an inverted U-shaped xenon flash tube 3, the solar element 2 and the flash tube 3 being mounted on a solar and tube tray 31. Other main components of the apparatus 10 are a circuit board 4, a single-cell rechargeable battery 5, and a base 6 that forms a bottom closure of the housing 1, the circuit board 4 and the battery 5 being located between the tray 31 and the base 6.

The lens 11 is formed with a suitable transparent plastic material and having a ribbed, truncated conical shape, the lens 11 being clipped onto the housing 1 by any suitable means. The solar element 2 includes several series-connected cell segments 21, designated 21a, 21b, 21c, and 21d, the element 2 having a pair of end element terminals, designated PV+ and PV− for connection to the circuit board 4 as described below. The solar tray 31 is formed having a spaced pair of tube clearance holes, designated holes 31a and 31b, for permitting terminal extremities of the xenon flash tube 3 to protrude the tray 31, being soldered onto the underside thereof. The tray 31 is fastened to the housing 1 by two screws, designated 66a and 66b, through two screw holes 66e and 66f of the tray 31 for fastening to the undersides of corresponding posts 66c and 66d that are formed in the housing 1.

The solar terminals PV+ and PV−, and three flash tube terminals, designated FV+, FV− and FVt, are fastened on the bottom of the tray 31. Wire conductors, designated 32a and 32b from the terminals PV+ and PV−, and conductors 32c, 32d and 32e from the terminals FVt, FV+ and FV, are connected to appropriate locations on the circuit board 4 as described below, by soldering. The circuit board 4 is mounted in spaced relation under the tray 31 by a pair of standoff posts 68c and 68f, and a pair of screws 68a and 68d that protrude corresponding holes 68b and 68e of the circuit board 4, the posts 68c and 68f being riveted at spaced locations on the tray 4.

A battery holder 53 for the battery 5 is mounted onto the base 6 by suitable means such as by riveting, a pair of wires, designated 51 and 52, connecting the holder 53 to the circuit board 4. The base 6 is removably connected to the housing 1 by a pair of screws, designated 67a and 67b, that protrude corresponding holes 67e and 67f of the base 6, and threadingly engaging corresponding posts 67c and 67d that are formed in the housing 1. An opening 78c is formed in the base 6 for engaging fastener means (not shown) whereby the apparatus 10 may be secured in place.

With further reference to FIG. 2, the circuit module includes a power section 41 to which are connected the conductors 32a and 32b from the solar element 2, and the conductors 51 and 52 from the battery 5. The power section 41 feeds a control section 42, a driver section 44, and a transformer section 45, the transformer section 45 feeding a DC filter section 46 that drives the flash tube 3 and a trigger filter section 47, a trigger transformer 48 being connected between the filter section 46 and the trigger terminal FVt of the flash tube 3 by the conductor 32c, the conductors 32d and 32e being connected across the DC filter section 46.

As shown in FIG. 2, the power section 41 includes a protection diode S1 through which the battery 5 is charged when sufficient light reaches the solar element 2. An important feature of the present invention is that fewer than 6 of the segments 21 are required to be series-connected in the solar element 2 for generating sufficient voltage to charge the battery 5. For example, the battery 5 in a preferred nickel-cadmium (Ni-Cad) configuration has a cell voltage of 1.2 volts. Allowing for 0.7 volt across the diode S1, only four of the segments 21 (generating 0.5 volt each) are required for charging the battery 5 with slightly in excess of 1.2 volts.

A control input 41a extends from the cathode of the diode S1 for feeding series connected first and second resistors R1 and R2 of the control section 42, the base of a control transistor Q1 being connected between R1 and R2, the emitter of the transistor Q2 being powered in common with the first resistor R1 and the anode of the diode S1 from the negative side of the battery 5. The control transistor Q1 is activated when the voltage across the solar element 2 falls below the voltage of the battery 5 sufficiently for forwardly biasing the base of the transistor Q1. Conversely, the base of Q1 is reverse biased when the battery 5 is being charged by the solar element 2. As further shown in FIG. 2, a control bypass switch 7 is connected across the emitter and collector of the transistor Q1 for selectively forcing activation of the control section 42 when it is desired to operate the flash tube 3 in daylight.

The driver section 44 includes a first capacitor C1 that is discharged by the control transistor Q1 through a collector resistor R3 for feeding a first primary winding 45a of a first transformer Tr1 of the transformer section 45, the transformer Tr1 also having a second primary winding 45b and a secondary winding 45c, the windings 45a and 45c having a common connection to the base of a driver transistor Q2 through a base resistor R4. The second primary winding 45b, which is connected in common with the first capacitor C1 to the battery 5, is driven by the collector of the driver transistor Q2, the emitter of the transistor Q2 being connected to the opposite side of the battery 5 in common with the solar element 2. A second capacitor C2 is connected between the collector and emitter of the driver transistor Q2.

The driver section 44 is operative in combination with the transformer section 45 for producing an oscillating high voltage of approximately 250 volts to approximately 350 volts at the secondary winding 45c of the transformer Tr1, a pulse current passing through the driver transistor Q2, the circuit configuration providing particularly rapid current transitions for power savings on the order of 30 percent over conventional voltage multiplier art.

The DC filter section 46 includes a rectifier diode S2 for charging a filter capacitor C3 on positive excursions of the secondary winding 45c, thereby producing high voltage direct current for powering the trigger filter section 47 and the flash tube 3 from a filter output 46a of the filter 46.

The Filter output 46a charges a trigger capacitor C4 of the trigger filter section 47 through a trigger resistor R5, the capacitor C4 powering the primary winding 48a of the trigger transformer 48, also designated Tr2 in FIG. 2. The trigger section 47 also includes a trigger diode (S.S.S.) or diac D1 that is connected in series with the winding 48a for blocking current therethrough until the trigger capacitor C4 charges to a predetermined high voltage. Once the capacitor C4 charges sufficiently, the diac D1 produces a short circuit for pulsing the trigger transformer 48, whereby an ultra high voltage is momentarily produced at a trigger output 48c from a secondary winding 48b of the transformer 48 for firing the flash tube 3.

The firing of the flash tube 3 momentarily partially discharges the filter capacitor C3, the trigger capacitor C4 also being at least partially discharged by the trigger transformer 48. The high voltage at the filter output 46a is restored relatively quickly, the trigger capacitor C4 recharging more slowly as dictated by the trigger resistance R5. Thus the period of time between successive firings of the flash tube 3 is dictated by the selection of the resistance of the resistor R3 and to a limited extent, by the capacitance of the trigger capacitor C4 (the capacitor C4 being at least sufficiently large for delivering the required energy to the trigger transformer 48 for firing of the flash tube 3).

The operation of the various components of the apparatus 10 is further illustrated in FIG. 3 as a charge-flash process 100. From an initial starting condition, the power section 41 is operative for testing in a charge test step 102 whether a charging voltage is being generated by the solar element 2: if so, the battery 5 is charged in a charging step 102, followed by repetition of the charge test step 102, the first diode S1 being forward biased; otherwise, a control test step 104 is initiated for testing whether the apparatus 10 is in a darkened environment, in which case the first diode S1 is sufficiently reverse biased that the first transistor Q1 is activated. If so, an advance step 108 is entered as described below; otherwise, the charge test step 102 is repeated as discussed above.

In the advance step 108, the primary windings 45a and 45b are regeneratively powered from the battery 5, the first and second capacitors C1 and C2 of the driver section, in combination with the collector resistor R3 and the driver transistor Q2 powering the windings 45a and 45b at high frequency. The secondary winding 45c is operative in a boost step 110 for producing a corresponding high frequency voltage for feeding the rectifier diode S2 of the DC filter section 46 in a rectifying step 112, the diode S2 charging the filter capacitor C3 in a filter charge step 114 for producing a relatively high DC voltage for powering the flash tube 3 as described below.

In response to the filter charge step 114, the trigger capacitor C4 of the trigger filter section 47 is charged in a trigger charge step 116 through the trigger resistor R5, followed by a trigger test step 118 in which the trigger diode D1 tests whether the trigger capacitor C4 is charged sufficiently for triggering the flash tube 3 by means of the trigger transformer 48. If not, control is transferred to the charge step 102 as described above; otherwise, the trigger diode D1 fires in a trigger pulse step 120 for driving the trigger transformer 48, the trigger capacitor C4 consequently being discharged through the primary winding 48a and the trigger diode D1. The secondary winding 48b of the trigger transformer 48 then applies the ultra-high voltage of from approximately 1800 volts to approximately 4000 volts in a fire lamp step 122 in which operation of the flash tube 3 is initiated. Upon firing of the lamp, a drive lamp step 124 is initiated wherein the flash tube 3 is powered across its terminals FV+ and FV−, partially discharging the filter capacitor C3. In the drive lamp step 124, some continued charging of the filter capacitor C3 may occur through the rectifier diode S2, such charging being normally insignificant compared with the discharging by the flash tube 3. The partial discharging of the filter capacitor C3 eventually results in termination of the operation of the flash tube 3, control again being transferred in the charge-flash process to the charge test step 102 as described above.

Efficient operation of the apparatus 10 according to the present invention is achieved by resuming successive cycles of the filter charge step 114 subsequent to the drive lamp step 124 with the filter capacitor C3 in a partially charged condition.

Although the present invention has been described in considerable detail with reference to certain preferred versions thereof, other versions are possible. For example, the bypass switch 7 can be dispensed with when manual operation of the apparatus 10 is not required. Therefore, the spirit and scope of the appended claims should not necessarily be limited to the description of the preferred versions contained herein.

What is claimed is:

1. A solar warning light apparatus comprising:
   (a) a housing;
   (b) a solar cell module in the housing, the cell module having not more than five cell elements connected in series;
   (c) a single cell rechargeable battery;
   (d) control circuit means operable in a first mode charging the battery in response to a threshold rate of solar energy being received by the cell module, and in a second mode for producing a control signal when less than the threshold rate of solar energy is being received by the cell module;
   (e) a voltage multiplier circuit powered by the battery and responsive to the control signal, the voltage multiplier circuit comprising:
      (i) a first capacitor having a reference connection and a control connection, the control connection being resistively connected to control switch means responsive to the control signal;
      (ii) a driver transformer having first and second primary windings and a secondary winding, the first primary winding being connected between the control connection an a common connection to the secondary winding, the second primary winding being connected across the battery in series with drive switch means, the drive switch means being responsively coupled to the common connection between the first primary and secondary windings of the driver transformer; and
      (iii) first rectifier means connected between the battery and the secondary winding of the driver transformer;
   (f) a gas-discharge tube lamp; and
   (g) trigger means for firing the lamp in response to the voltage multiplier circuit.

2. The apparatus of claim 1, wherein the secondary winding of the driver transformer is operative for producing a multiplier voltage of at least approximately 250 volts.

3. A solar warning light apparatus comprising:
   (a) a housing;
   (b) a solar cell module in the housing, the cell module having not more than five cell elements connected in series;
   (c) a single cell rechargeable battery;
   (d) means for charging the battery from the solar cell module;
   (e) a voltage multiplier circuit powered by the battery, comprising:
      (i) a first capacitor having a reference connection and a control connection, the control connection being resistively connected to control switch means responsive to the control signal;

(ii) a driver transformer having first and second primary windings and a secondary winding, the first primary winding being connected between the control connection and a common connection to the secondary winding, the second primary winding being connected across the battery in series with drive switch means, the drive switch means being responsively coupled to the common connection between the first primary and secondary windings of the driver transformer; and (iii) filter rectifier means connected between the battery and the secondary winding of the driver transformer;

(f) a gas-discharge tube lamp; and (g) trigger means for firing the lamp in response to the voltage multiplier circuit.

4. A solar warning light apparatus comprising:
(a) a housing;
(b) a solar cell module in the housing;
(c) a rechargeable battery;
(d) control circuit means operable in a first mode charging the battery in response to a threshold rate of solar energy being received by the cell module, and in a second mode for producing a control signal when less than the threshold rate of solar energy is being received by the cell module, the control circuit means automatically cycling the apparatus between the first and second modes in response to daytime and nighttime ambient light levels;
(e) a voltage multiplier circuit powered by the battery and responsive to the control signal, the voltage multiplier circuit comprising:

(i) a first capacitor having a reference connection and a control connection, the control connection being resistively connected to control switch means responsive to the control signal;

(ii) a driver transformer having first and second primary windings and a secondary winding, the first primary winding being connected between the control connection and a common connection to the secondary winding, the second primary winding being connected across the battery in series with drive switch means, the drive switch means being responsively coupled to the common connection between the first primary and secondary windings of the driver transformer for producing an elevated voltage on the secondary winding, the elevated voltage being greater than a battery voltage of the battery; and (iii) filter rectifier means connected between the battery and the secondary winding of the driver transformer for filtering the elevated voltage;

(f) a gas-discharge tube lamp; and (g) trigger means for firing the lamp in response to the voltage multiplier circuit.

5. The apparatus of claim 1, wherein the control circuit means comprises a first diode connected in series with the battery, the first diode being forward-biased in the first mode and reverse biased in the second mode.

6. The apparatus of claim 5, wherein the control signal is a reverse bias voltage across the first diode.

7. The apparatus of claim 1, wherein the trigger means comprises a trigger transformer having primary and secondary windings, the secondary winding being connected to a trigger electrode of the tube lamp, the primary winding being connected in series with a trigger diode, the combination of the primary winding of the trigger transformer and the trigger diode being powered by a trigger filter circuit from the voltage multiplier circuit, a periodic pulse interval of the lamp being directly related to a filter time constant of the trigger filter.

8. The apparatus of claim 7, wherein the cell module has not more than four of the cells connected in series, the secondary winding of the trigger transformer producing a trigger voltage of at least approximately 1000 volts.

9. The apparatus of claim 1, wherein the housing includes a transparent lens member for covering the solar cell module and the tube lamp.

10. The apparatus of claim 9, wherein the lens member has a horizontally disposed central portion and a side portion, the side portion sloping downwardly and outwardly from the central portion and having ribs formed therein for directing light horizontally outwardly from the tube lamp.

11. The apparatus of claim 9, wherein the lens member is generally cylindrical relative to a vertical axis of the housing.

* * * * *